[66.]
HENRY H. RAY.
Improvement in Bending and Tempering Mold-Boards.
No. 119,406.  Patented Sep. 26, 1871.
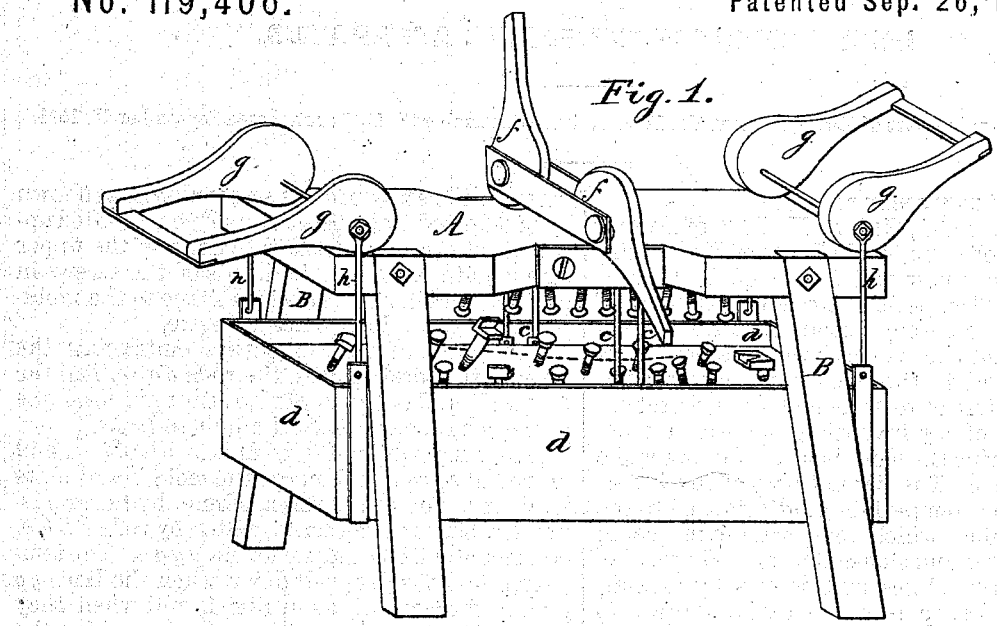
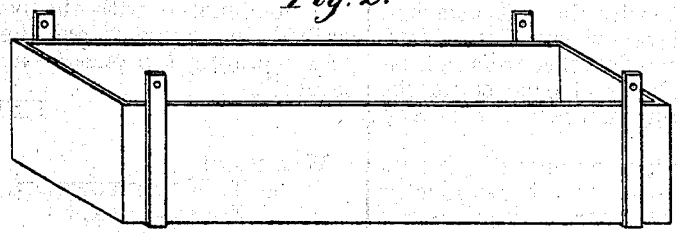
Witnesses.  Inventor.

*Reissued March 26th 1872*

119,406

UNITED STATES PATENT OFFICE.

HENRY H. RAY, OF ARENA, WISCONSIN.

IMPROVEMENT IN TEMPERING APPARATUS.

Specification forming part of Letters Patent No. 119,406, dated September 26, 1871; antedated September 23, 1871.

*To all whom it may concern:*

Be it known that I, HENRY H. RAY, of Arena, in the county of Iowa, in the State of Wisconsin, have invented a new and Improved Method of Bending and Tempering the Mold-Boards of Plows; and I do hereby declare that the following is a full and exact description thereof, reference being had to the accompanying drawing and to the letters of reference marked thereon.

The nature of my invention consists in a device for tempering the mold-boards of plows while the plate is hot. The second part of my invention relates to a tempering-fount attached to the bending-machine, which tempering-fount being filled with water and suspended immediately beneath the screw-plates and screws by rods attached to levers, so as to be readily drawn up and lowered for the purpose of throwing the water on and taking it off the mold-board plate for the purpose of tempering it.

Figure 1 is a side view of the entire machine, showing the screw-plates and screws adjusted, and the tempering-fount with the rods attached to the levers, and the levers themselves. Fig. 2 shows the tempering-fount detached from the machine, with straps and holes at each corner for the purpose of suspending on the rods $h\ h\ h\ h$ to be operated.

A is the upper screw-plate, supported by braces B B B B, the lower screw-plate being supported by rods $c\ c\ c\ c$. The mold-board plate is placed between the screws in the screw-plates, as shown by the dotted line. The levers $f\!f$ being lifted upward and thrown toward the center of the upper screw-plate A brings the heads of the screws in contact, and gives the desired shape to the mold-board plate while in a heated state.

The parts of this invention embracing the screws, the screw-plates, the rods $c\ c\ c\ c$, and the levers $f\!f$, and the general manner of giving shape to the mold-board plate, I admit to be old.

The tempering-fount is filled with water and arranged so as to submerge the mold-board plate while it is hot and in the machine, by being suspended beneath the screw-plates by rods $h\ h\ h\ h$, connected with eccentric levers $g\ g\ g\ g$. The tempering-fount is dropped down when the lines $g\ g\ g\ g$ are thrown out, as in Fig. 1, and when they are carried toward the center of the machine the fount is drawn up, submerging the screws and mold-board plate in water.

What I claim as my invention, and desire to secure by Letters Patent, is—

In combination with the bending device described, the trough $d$, and the rods $h$ and cams $g$ for operating the same, as and for the purposes set forth.

HENRY H. RAY.

Witnesses:
   C. T. WRYGLESWORTH,
   F. J. PRIDEAUX.